Aug. 26, 1969
K. R. GRIFFIN
3,463,844
METHOD OF PARTIAL CAVITY MOLD FORMING
Filed June 1, 1967
2 Sheets-Sheet 2
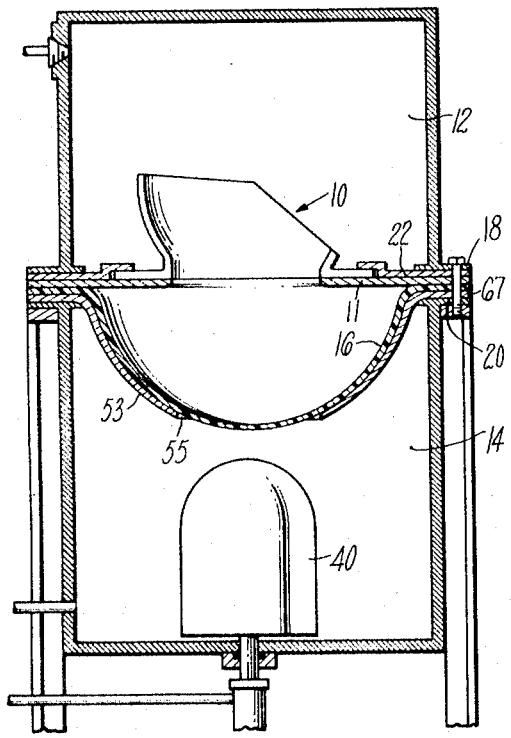
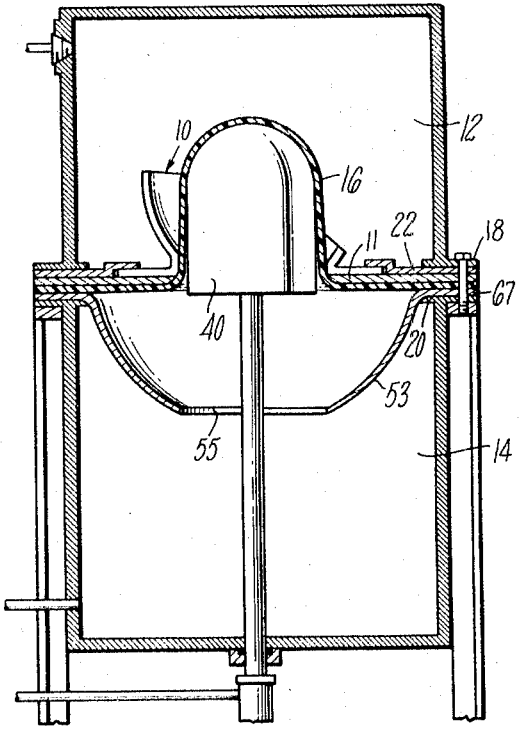
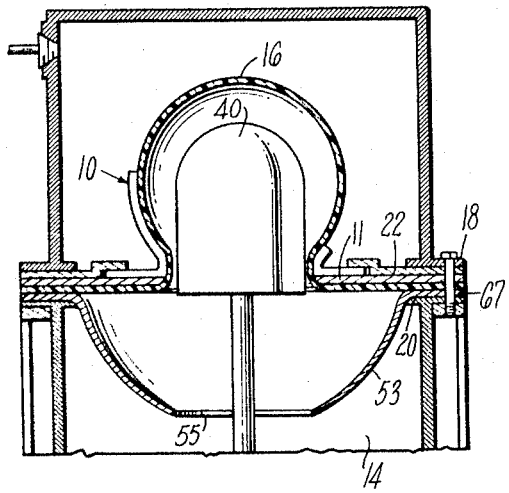
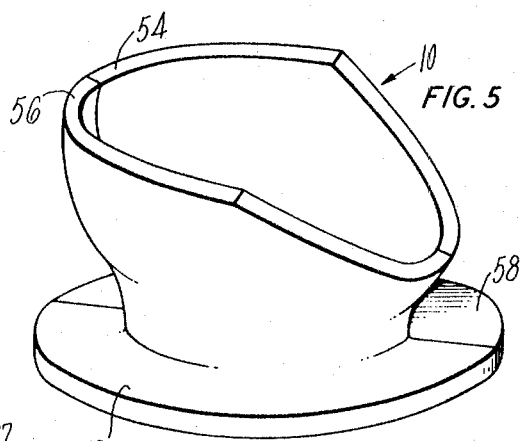
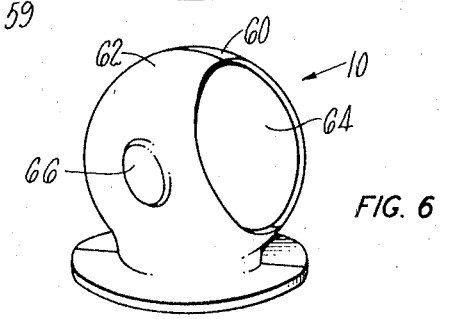

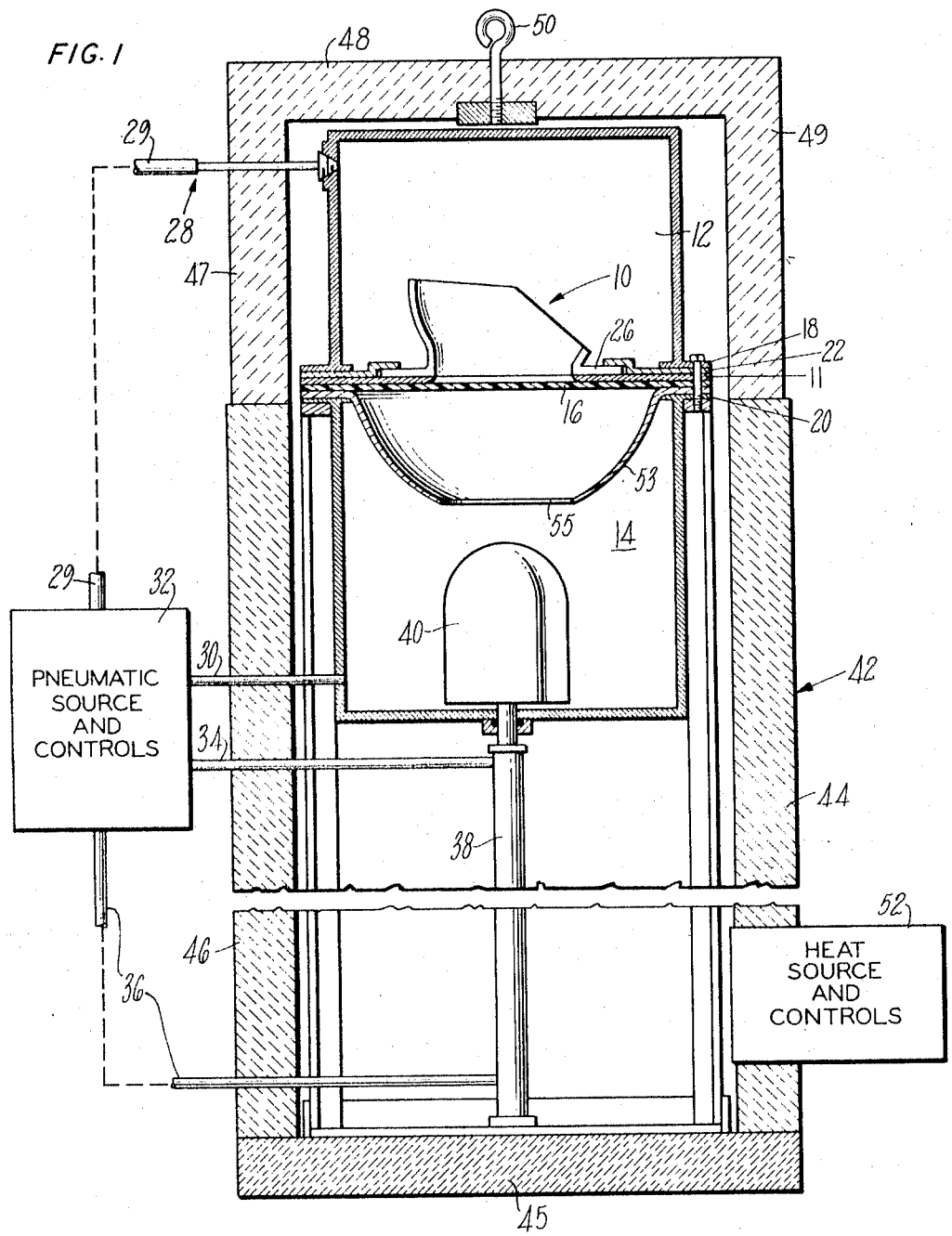

United States Patent Office 3,463,844
Patented Aug. 26, 1969

3,463,844
METHOD OF PARTIAL CAVITY MOLD FORMING
Kenneth R. Griffin, West Suffield, Conn., assignor to United Aircraft Corporation, East Hartford, Conn., a corporation of Delaware
Filed June 1, 1967, Ser. No. 642,821
Int. Cl. B29c *17/04*
U.S. Cl. 264—89     2 Claims

ABSTRACT OF THE DISCLOSURE

A thermoplastic sheet is brought to molding temperature, the sheet is then ballooned, by fluid pressure, to contact a partial hemispherical mold, the balloon of material is guided into a partially broken away cavity mold by means of an assisting plug, the cavity mold being oriented opposite to the direction into which the thermoplastic sheet is initially ballooned by pneumatic pressure, and finally the thermoplastic material is inflated within the partially broken away cavity mold so as to cause the material to assume the shape of the cavity mold in portions thereof which contact said mold, and to assume a natural three-dimensional curvilinear configuration as a result of fluid pressure in areas thereof which are not in contact with said mold. The article is cooled and then removed from a multisection mold. Using a partially broken away cavity mold permits forming a portion of the article without contact with the cavity mold, whereby surface properties of the thermoplastic material are unimpaired by contact with the mold over some surface of the article.

BACKGROUND OF THE INVENTION

Field of the invention.—This invention relates to forming an article of thermoplastic material by a combination of free-form pneumatic and pneumatically-forced cavity molding techniques.

Description of the prior art.—It is well known that thermoplastic sheets may be formed into shapes by either one of two processes. A first process uses fluid pressure to free-form a preheated sheet of thermoplastic material into a three-dimensional curvilinear form, such as may be used in bubble canopies on military aircraft. The other well-known method is the use of fluid pressure to force preheated thermoplastic sheets into cavity molds so that the sheet is caused to be forced against the mold and thereby assume the shape thereof. The first method is very useful when simple curvilinear designs are required, and is particularly well adapted to achieve products having good optical qualities that are not spoiled by pressurized contact with surfaces of the mold. The second method is well adapted to making complex shapes which require complex curves; however, the latter process is not useful where good optical properties are required, since the forcing of the material into contact with the mold spoils the surface properties of the material, thereby impairing its optical qualities. When extreme shapes are to be formed, the method used must be capable of supplying a uniform thickness of material even though inverse curves and deep forms are required.

SUMMARY OF INVENTION

An object of the invention is to achieve an article having good optical qualities and good mechanical properties, which is manufactured by a relatively inexpensive and reliable method compatible with extreme article configurations. Another object is cavity mold forming of a thermoplastic article in a single heat cycle.

In accordance with the present invention, a thermoplastic article (for example, a space helmet) is produced by a process in which thermoplastic material is ballooned partially against a mold and partially in a free-form curvilinear fashion. In further accord with the present invention, partial molding is achieved in combination with partial free-forming by means of a partial cavity mold, which is defined herein as a mold which, when a pliable sheet is ballooned into it, will cause a portion of the sheet to form other than a completely free-blown three-dimensional curvilinear configuration as would result when a sheet is ballooned in a completely free-formed fashion through a simple opening in an essentially two-dimensional balloon orientating plate. More specifically, but not necessarily, a partial cavity mold as defined herein includes a mold which will permit forming inverse curves of a greater concavity than that which could be formed by free-form ballooning alone.

In further accord with the present invention, a pliable sheet which is to be forced into a concavity oriented in a given direction may first be uniformly stretched by being blown into a concavity of an opposite direction against the limitations of a stretching mold, and may thereafter be assisted into the cavity mold by means of an assist plug, in accordance with the teachings of the prior art.

In accordance with further aspects of the present invention, the techniques heretofore known in the free-form process of ballooning a pliable sheet into a curvilinear shape, as well as the techniques heretofore known in the prior art for pneumatic forcing of a pliable sheet into conformity with a cavity mold may all be utilized in the practice of the present invention. That is, the invention is capable of utilizing to advantage a considerable portion of the teachings of the prior art. However, in a case where the particular material being used, and a relatively constant thickness of the article manufactured is not required (permitting the article to have a thicker dimension outside of the configured portion than within the configured portion), certain of these techniques would not be required; however, this is in accordance with the teachings of the prior art and not a part of the invention herein.

The invention is most practically utilized in forming transparent sheets into articles having good optical qualities, such as in the manufacture of plastic space helmets. The use of the partial cavity mold permits, in such a case, the forming of a well-configured neck area, and the combination therewith of the free-forming technique permits ballooning a portion of the helmet without contact with the cavity mold so that the optical qualities of the sheet being used to form the article are not impaired by forced contact with the mold.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIGS. 1–4 are partially broken away front elevation views of apparatus for performing a process in accordance with the present invention, and an article produced thereby;

FIG. 5 is a perspective view of a mold used in the process of FIGS. 1–4 in accordance with a first embodiment of the present invention; and FIG. 6 is a perspective view of a mold used in the process of FIGS. 1–4 in accordance with a second embodiment of the present invention.

DESCRIPTION OF THE PREFERRED EMBODIMENT

Referring now to FIG. 1, a partial cavity mold 10, the configuration of which is shown more clearly in FIG. 5, is disposed relative to an upper pressure tank 12 and a lower pressure tank 14 so as to permit pneumatic forcing of a sheet of polycarbonate or other thermoplastic material 16 into a partially molded, partially freeblown article configured from the thermoplastic material 16, as shown more clearly in FIG. 4. The tanks 12 and 14 are provided with lips 18, 20, respectively so as to provide an airtight sealing arrangement at a suitable pressure. A clamp plate 22 clamps upper portions 54, 56 (FIG. 5) into engagement with a flange portion 26 (FIG. 1) of the cavity mold 10, to allow breaking the mold apart so as to remove the product formed therein.

The thermoplastic may preferably comprise a polycarbonate, because it has excellent optical and other qualities. A suitable polycarbonate material is marketed by the General Electric Company under the trade name "Lexan." However, polycarbonate is not generally used for forming extreme shapes such as that in the present case due to excess material thinning which has a tendency to cause the material to burst. The invention herein particularly relates to generating a high surface area, optical helmet having, or capable of having, a perimeter greater than the part opening through which the helmet is formed, with substantially uniform part thickness. Although a sheet of material is referred to herein, the material could be preformed in any desired way, so long as the properties thereof are not impaired thereby.

The tanks 12, 14 are connected by respective pneumatic lines 28, 30, to a pneumatic source and control system 32 which will provide suitable pressure ratios between the tanks 12, 14. The function of the source and controls 32, the method of operation thereof, and numerous embodiments of suitable devices are well illustrated and described in the patented prior art. Therefore, details of the source and controls will not be given herein. The source and controls 32 are also connected by a related pair of lines 34, 36 to a pneumatic cylinder system 38 which is utilized to drive a polished male assisting plug 40. The prior art describes numerous assisting plugs suitable for application herein as the assisting plug 40, together with drive means 34, 36, 38 therefor. Further description is believed unwarranted herein.

All of the apparatus 10–40 described hereinbefore with respect to FIG. 1 is contained within an oven 42 including suitable walls 44–49 and suitable heat source and controls 52 therefor. The walls 47–49 comprise a movable top portion which permits access to the mold 10, allowing the insertion of raw material and removal of the formed article. The top may be removed by means of a lift-ring 50, or may have hinges, or any other suitable means for access may be employed. The oven permits heating of the polycarbonate-thermoplastic sheet 16 to a suitable temperature, such as 360° F., and achieving the three-stage forming process described hereinafter under a single-heat cycle. This is one of the improvements to which the present invention is directed.

Referring to FIGS. 1–4, the forming process of the present invention commences with placing a sheet of polycarbonate or other thermoplastic material 16 in position as shown in FIG. 1. The temperature of the apparatus is then raised to a suitable temperature at which the polycarbonate material becomes pliable. Then, the pneumatic source and controls 32 provide a positive pressure difference between the tank 12 and the tank 14, so an initial blow process is achieved with respect to the sheet of polycarbonate material which causes the sheet of polycarbonate material 16 to form into a bubble which contacts the polished surface of a stretch-limiting mold 53, as a result of higher pressure in tank 12 than in tank 14, as shown in FIG. 2. The stretch-limiting mold 53 limits the stretching of the polycarbonate material as it is formed into a bubble, and assists in stretching the polycarbonate in such a fashion as to give a more uniform thickness of material. This is one of the aspects of the present invention, but should not be confused with the partial-cavity mold forming which relates to the partial-cavity mold 10. A passage 55 permits the assist plug to pass through the streach-limiting mold 53. Next, the assist plug 40 is forced against the sheet of poly-carbonate material 16 so as to push the sheet of polycarbonate material upwardly into the tank 12 in the area of the partial-cavity mold 10, as seen in FIG. 3. If desired, a slight pressure difference may be utilized between tanks 12 and 14, with the tank 14 having a slightly higher pressure than tank 12 during some portion of motion of the assist plug. The final step is to provide a positive pressure difference between the tanks 14 and 12 so that the sheet of polycarbonate material is inflated into a free-form bubble against the restriction of the partial cavity mold 10 as shown in FIG. 4. In the configuration of the partial cavity mold 10 illustrated in FIGS. 1–4, and shown in more detail in FIG. 5, the cavity mold provides for necking of the part formed so as to give it a general fish-bowl configuration having a neck entrance which has a lesser diameter than the largest diameter of the generally cylindrical portion thereof. On the other hand, the lack of a cavity mold over most of the surface of the sphere, as shown in FIG. 4, permits the polycarbonate material 16 to be free-blown into a generally cylindrical curvilinear shape without contact against the cavity mold under the pressure supplied from tank 14. Thus, a severe configuration is provided by the partial cavity mold 10, and good optical properties are achieved by freeblowing the major portion of the final product of polycarbonate material 16 (FIG. 4). Finally, the material is cooled, so as to resume a substantially non-pliable state, and then the oven is opened, the mold is disassembled, and the article is removed.

The partial cavity mold 10 is shown in detail in the perspective of FIG. 5 to include two halves 54, 56, which two halves may be bolted through holes (not shown) in the lip portions 58, 59 or may be suitably clamped to the split-form flange 11 shown in FIGS. 1–4. As illustrated herein, the partial cavity mold 10 is split from front to back, thereby forming a right half and left half as viewed in FIGS. 1–4 herein, and the split-form flange 11 is provided in a front half and a rear half so that when the parts 10, 11 are joined together by suitable bolting or clamping, an integral unit is formed. Other suitable arrangements may be used so as to provide a partial cavity mold which is capable of opening so as to permit removal of the final product shown in FIG. 4.

An alternative configuration of a partial cavity mold is illustrated in FIG. 6. Therein, the mold comprises two halves 60, 62 which are also adapted for joining with the split-form flange 11 as described hereinbefore. The embodiment of FIG. 6 illustrates that a general configuration which is not spherical may be provided by limiting the free-form area to a minimum optical area, as is illustrated by the void in the mold depicted at 64. Thus, the present invention may be practiced so as to provide a helmet having a generally nonspherical configuration with a free-blown optical area, and may also be practiced so as to provide specially molded areas, such as a headphone depression 66, which may be used for accommodating equipment or the like within the helmet itself. In other words, the invention may be utilized to provide any sort of molded configuration of the helmet proper by maintaining a sufficient optical area to be free-blown in accordance with the teachings herein.

The invention has been utilized to form polycarbonate sheet stock having a perimeter which is 18% greater than the perimeter at the neck opening, thus permitting the provision of a helmet having a surface area 600% greater than that which could be achieved if the overall helmet perimeter were limited to that of a required neck opening. As much as 60% or 70% of the surface of the helmet may have good optical qualities in accordance with the teachings herein, or a lesser surface may be provided with good optical qualities where detailed configuration of the helmet must be constrained by a cavity mold as illustrated by the embodiment of FIG. 6.

Although the invention has been shown and described with respect to preferred embodiments thereof, it should be understood by those skilled in the art that the foregoing and other changes and omissions in the form and detail thereof may be made therein without departing from the spirit and scope of the invention.

Having thus described typical embodiments of the invention, what I claim as new and desire to secure by Letters Patent of the United States is:

1. The process of forming an article of closely controlled geometrical and optical properties from a transparent thermoplastic material which comprises the steps of, sequentially:
   (a) providing a cavity mold having a three-dimensional complex curvilinear surface conforming to the shape of a substantial portion of the article to be formed, said mold having a void therein over a portion of its surface corresponding with a surface area of the article where optical quality is desired;
   (b) positioning a blank of the material external of said cavity mold;
   (c) heating the material to a pliable state;
   (d) imposing a fluid pressure differential across the material sufficient to balloon the material, forcing portions of the material adjacent to the mold into intimate contact with mold surfaces and ballooning the remaining portions of the material into a three-dimensional simple curvilinear configuration; and
   (e) cooling the material to an unpliable state while maintaining the pressure differential.

2. The process of forming an article as described in claim 1 additionally comprising the steps, between steps (c) and (d), of:
   preforming said material by fluid pressure forcing of said material into a stretch limiting mold having concavity in the direction opposite to the concavity provided in step (d), so as to initially stretch and distribute said thermoplastic material; and
   moving said material, by means of an assist plug passed through a passage in said stretch limiting mold, from said stretch limiting mold into the area of said partial cavity mold with substantially the same orientation of concavity as provided in step (d), to thereby facilitate the reversal of concavity of said material so as to aid in the performance of step (d).

References Cited

UNITED STATES PATENTS

| 2,856,634 | 10/1958 | Ames | 18—19 |
| 2,917,783 | 12/1959 | Olson et al. | 264—92 X |

OTHER REFERENCES

Plastics Engineering Handbook, 3rd edition, 1960, pp. 103–107.

ROBERT F. WHITE, Primary Examiner

J. H. SILBAUGH, Assistant Examiner

U.S. Cl. X.R.

18—5, 19; 264—93